(12) United States Patent
Lykkja et al.

(10) Patent No.: US 9,886,849 B2
(45) Date of Patent: Feb. 6, 2018

(54) TOLL OBJECT DETECTION IN A GNSS SYSTEM USING PARTICLE FILTER

(71) Applicant: Q-Free ASA, Ranheim (NO)

(72) Inventors: Ola Martin Lykkja, Rasta (NO); Geir Olve Storvik, Høvik (NO); Jon Glenn Gjevestad, Ås (NO); Anders Løland, Oslo (NO)

(73) Assignee: Q-Free ASA, Ranheim (NO)

( * ) Notice: Subject to any disclaimer, the term of this patent is extended or adjusted under 35 U.S.C. 154(b) by 344 days.

(21) Appl. No.: 14/726,654

(22) Filed: Jun. 1, 2015

(65) Prior Publication Data

US 2015/0348409 A1 Dec. 3, 2015

(30) Foreign Application Priority Data

Jun. 3, 2014 (NO) .................................. 20140686

(51) Int. Cl.
*G08G 1/01* (2006.01)
*G01S 19/14* (2010.01)
*G01S 19/42* (2010.01)
*G07B 15/06* (2011.01)

(52) U.S. Cl.
CPC ............ *G08G 1/0112* (2013.01); *G01S 19/14* (2013.01); *G01S 19/42* (2013.01); *G07B 15/063* (2013.01)

(58) Field of Classification Search
CPC ....... G08G 1/0112; G01S 19/14; G01S 19/42; G07B 15/063
See application file for complete search history.

(56) References Cited

U.S. PATENT DOCUMENTS

| 5,323,322 A * | 6/1994 | Mueller | G01S 5/0009 342/357.27 |
|---|---|---|---|
| 7,324,017 B2 * | 1/2008 | Hartinger | G07B 15/06 340/928 |
| 7,774,158 B2 * | 8/2010 | Domingues Goncalves | G01C 21/12 701/26 |
| 2007/0218931 A1 * | 9/2007 | Beadle | H04B 7/18589 455/502 |
| 2009/0132164 A1 | 5/2009 | Goodall et al. | |
| 2009/0157566 A1 * | 6/2009 | Grush | G01C 21/28 705/400 |
| 2013/0265191 A1 * | 10/2013 | Ghinamo | G01S 19/40 342/357.23 |
| 2013/0297204 A1 * | 11/2013 | Bartels | G01C 21/165 701/495 |
| 2014/0074768 A1 * | 3/2014 | Horwood | B64G 3/00 706/52 |

(Continued)

FOREIGN PATENT DOCUMENTS

EP 2230644 A1 9/2010
EP 1332336 B1 10/2012

*Primary Examiner* — Calvin Cheung
(74) *Attorney, Agent, or Firm* — Alix, Yale & Ristas, LLP (57) ABSTRACT

A particle filter, also known as Sequential Monte Carlo Method, used to estimate vehicle position based on GNSS pseudo range measurements and other sensors. The particle filter creates an ensemble of particles and road user charging (road tolling) can be performed on each particle. The resulting distribution of assessed vehicle passages is analyzed to assess if the event actually took place or not. The use of particle filter overcomes limitations occurring while employing traditional Kalman filter based methods.

20 Claims, 7 Drawing Sheets

(56) References Cited

U.S. PATENT DOCUMENTS

| | | | |
|---|---|---|---|
| 2014/0372073 A1* | 12/2014 | Georgy | G01S 5/0294 702/153 |
| 2015/0142248 A1* | 5/2015 | Han | G01C 21/3602 701/23 |
| 2015/0219767 A1* | 8/2015 | Humphreys | G01S 19/43 342/357.26 |
| 2015/0282112 A1* | 10/2015 | Bialer | G01S 1/02 455/456.1 |
| 2016/0055466 A1* | 2/2016 | Du | G06Q 20/145 705/13 |

* cited by examiner

TOLL OBJECT DETECTION IN A GNSS SYSTEM USING PARTICLE FILTER

BACKGROUND

The present disclosure concerns, according to a first aspect, a method for assessing passages by a vehicle through a tolling object. According to another aspect, the disclosure concerns a system for conducting said method.

Systems and methods for automatic controlling passages of objects, typically vehicles, into and/or out from certain geographic areas why possibly assigning them to distinct road segments, have been developed during the recent decades, and systems and methods based on Global Navigation Satellite Systems (GNSS) technology are prevailing.

Satellite based road tolling systems are rapidly growing in number due to their versatility and flexibility. It allows for an advanced time/distance/place concept where policy makers can adjust prices to best fit their objectives. A number of distinct tolling schemes may be applied based on a combination of segment based tolling where road usage cost is derived from use of road segments; cordon based tolling where there is a cost associated with travelling into (or out from) a zone; virtual gantry based tolling where there is a fee associated with crossing a virtual tolling point; and finally distance based tolling where the fee is derived from the distance driven. The tolling schemes can be divided into discrete schemes (segment, cordon zone, and gantry) and continuous scheme (distance). Non-repudiation of the tolling statement is a very important aspect of the toll system. This includes both proving that the toll statement is genuine and proving that the system correctly identifies vehicles travelling in and out of tolling zones.

Even if the average performance and availability of GNSS systems today are very good, there will still be situations where the tolling system may be mislead by erroneous position estimates from the GNSS system. In particular in geographical areas where parts of the sky are obstructed by natural or man-made objects this may be of great concern.

Figure 1:
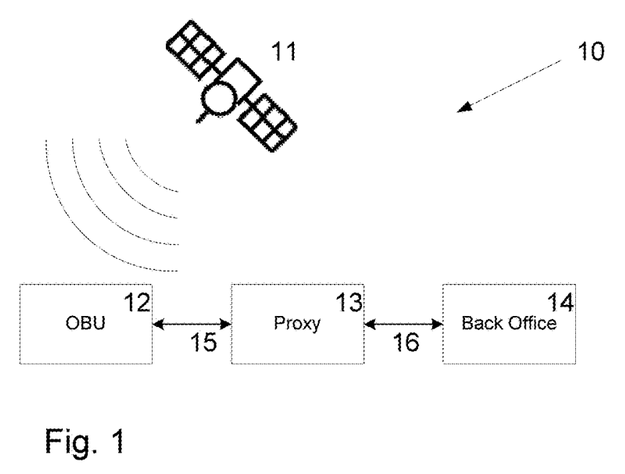
FIG. 1 is a schematic illustration of a system architecture of a GNSS based system for vehicle localization monitoring, which is compliant with ISO 17573.

GNSS based tolling and the system model in FIG. 1 is described by international standards. Of most relevance to this disclosure is ISO 17573 Electronic Fee Collection—Systems architecture for vehicle-related tolling and ISO 12855 Electronic Fee Collection—Information exchange between service provision and toll charging. The European Union is working towards a common European interoperable system for tolling where road users have On Board Units (OBU) and a contract with one home toll operator enabling pan-European roaming where foreign toll charges are invoiced through the home toll operator. This is known as the EETS directive, Directive (2004/52/EC) of the European Parliament and of the Council of 29 Apr. 2004 on the interoperability of electronic road toll systems in the Community. Furthermore the European Commission Decision (2009/750/EC) of 6 Oct. 2009 on the definition of the European Electronic Toll Service and its technical elements puts this into effect.

A satellite based road tolling system comprises 3 main physical elements: 1) The satellites, 2) vehicles equipped with OBUs observing signals from the satellites, and 3) a so-called back office.

The most typical use of such systems is for tolling, where each vehicle owner pays a certain fee for use of the road. The reliable detection of zones, virtual gantries, and segments are important aspects of such tolling systems. In general there are three kinds of errors encountered with the use of such systems, one being a false registration of an event, the other being missed recognition of an event that actually occurred; the detection may erroneously be attributed to a wrong location or a wrong time; additionally the travelled distance may be calculated wrongly. All errors may result in lower user confidence in the system and increased operational costs.

The use of particle filters for estimation in general, and for positioning in particular, is known from the scientific literature. Two papers in particular give a good overview of the methods: "An Overview of Existing Methods and Recent Advances in Sequential Monte Carlo" (Olivier Cappé Simon J. Godsill, and Eric Moulines, Proceedings of the IEEE, Volume 95, Issue 5, 2007), and "Particle Filters for Positioning, Navigation and Tracking" (Fredrik Gustafsson, Fredrik Gunnarsson, Niclas Bergman, Urban Forssell, Jonas Jansson, Rickard Karlsson, Per-Johan Nordlund, IEEE Transactions on Signal Processing, Special issue on Monte Carlo methods for statistical signal processing, Issue 2, February 2002).

EP 1 332 336 B1 concerns a method and a system for positioning of a moveable object. More specifically, this publication relates to a map-aided positioning system wherein map information and relative position information is combined to estimate an absolute position indication by calculating a position estimate by recursively estimating in a non-linear filtering algorithm the conditional probability density for the position.

US20090132164 A1 teaches a reinforcement learning technique for online tuning of integration filters of navigation systems needing a priori tuning parameters, such as Kalman Filters and the like. The method includes receiving GNSS measurements from the GNSS unit of the navigation system; and IMU measurements from IMU of the navigation system. The method further includes providing a priori tuning parameters to tune the integration filter of the navigation system. The method further includes processing the GNSS and IMU measurements using the tuned integration filter to compute a position estimate and updating the a priori turning parameters based on the computer position estimate.

US20130265191 describes a method of determining a geographic position of a user terminal including a receiver of signals of a global navigation satellite system, the method including the user terminal: performing pseudo-range measurements related to a plurality of signals received from transmitters of the global navigation satellite system; calculating a first estimated position thereof by a weighted least squares method; calculating post-fit residuals for the first estimated position; comparing the calculated post-fit residuals to a first threshold and: in case the first threshold is exceeded, calculating a second estimated position using a Monte-Carlo method, otherwise retaining the first estimated position as the geographic position of the mobile communications terminal.

U.S. Pat. No. 7,324,017B2 concerns a process for determining travel through at least one toll road section by at least one vehicle by means of a position determination system which is set up to determine the current position of the at least one vehicle, whereby positions of the at least one vehicle are compared with the position of at least one reference point characteristic for an entrance to a toll road section, whereby the orientation of the vehicle is determined within a specifiable region about the entrance, whereby it is determined whether the orientation determined agrees within a specifiable tolerance range with the orientation characteristic of entry onto the toll road section.

EP2230644A1 describes a method which involves maintaining global positioning systems of vehicles in standby.

Positioning functions of the global positioning systems are stimulated at the proximity of geographical positioning points e.g. taxation points, where the stimulation of the positioning function of each global positioning system is calculated from an origin positioning instant, near geographical positioning point and maximum speed of the vehicles.

In spite of the teachings mentioned above there is still a need for improved methods and systems for detection of objects, such as vehicles, passing into and out from a geographical zone, crossing virtual gantries, and driving on certain segments of the road network, providing improved reliability and reduced risk of false one crossing assessments.

SUMMARY

The disclosed method and a system provides a simple and inexpensive means of improving the reliability of satellite based tolling systems, increasing the confidence and robustness of such methods and systems.

The method and system may also be used for related purposes in non-tolling applications.

Figure 12:
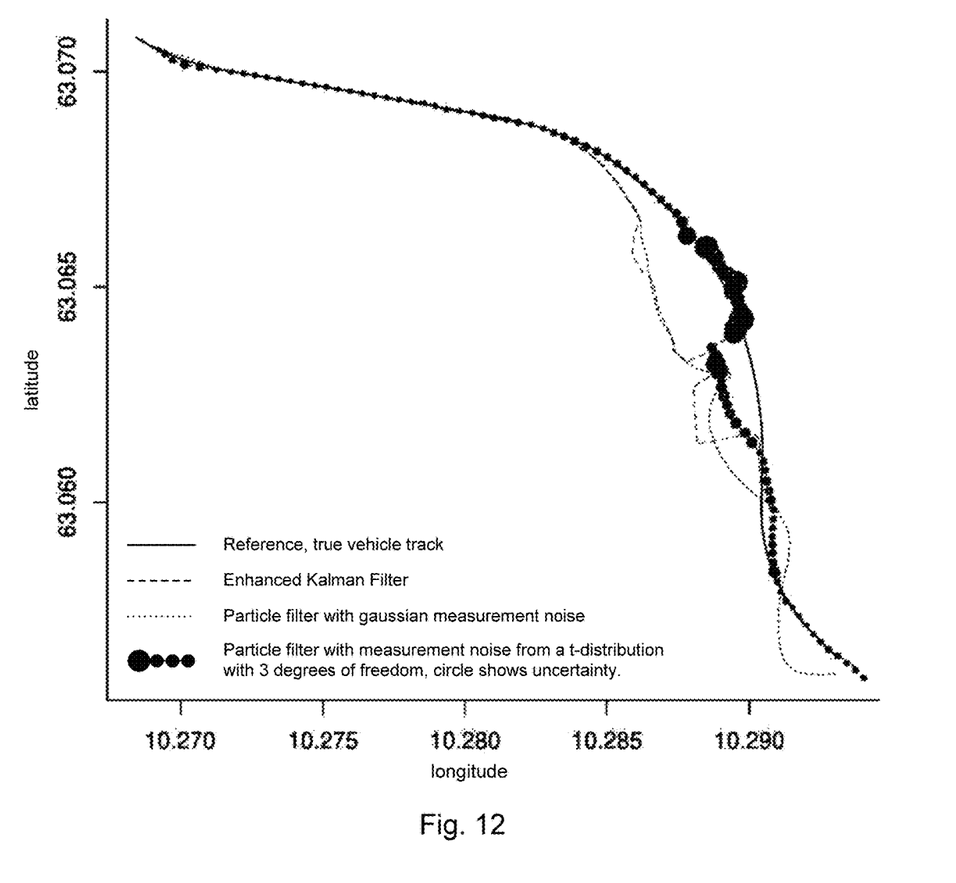
FIG. 12 shows results from an experiment comparing two instances of the Particle filter method with the Extended Kalman filter and the true vehicle track for a road in a narrow mountain canyon.

Actual full scale tests have proven that the method and system disclosed herein leads to an improvement in accuracy and confidence of such systems, as elaborated below in relation to FIG. 12. The method exposes more detailed information about the probability distribution of the position and thus virtual gantry, zone and segment passages, enabling the system to better identify situations where decision confidence is low.

According to the disclosure, a passage detection method based on Sequential Monte Carlo method (also known as particle filter) is applied to the domain of identifying passages by a vehicle through a tolling object utilizing GNSS systems. Prior art systems and methods often treat the positioning method and the passage detection method as two separate domains. Typically, passage detection simply uses information from a GNSS-based position system and subsequently uses the estimated position and the associated and often poorly estimated error estimates from the system as a basis for its passage assessment. The disclosed method and system unifies these two methods in an integrated method. This unification allows the passage detection to base its decisions on a much larger set of information. At the same time, the passage detection will result in an estimated probability distribution that closely represents the true probability. This allows the system to select an arbitrary confidence margin and only issue toll transactions when the required confidence level is met.

It should be noted that as used herein, the term "vehicle" is meant to be interpreted in the broadest sense possible, not limited to automobiles and the like.

Below the method and system is described in terms of a method and system for assessment of vehicles passing into and out from a certain zone, passage of a certain virtual gantry, passage of a certain road segment, and assessing distance driven by-vehicles. It should be emphasized that the method and system as such, while suited for such a purpose, is a general system for detection of objects passing into and out from a zone, or passage of check points (virtual gantries), etc., irrespective of the subsequent use of said information.

BRIEF DESCRIPTION OF THE DRAWINGS

Below the invention is described in further detail with reference to enclosed drawings, where.

DETAILED DESCRIPTION

It should be noted that the method and system according to the disclosure is particularly useful in charging for road use, which is also reflected to some extent in the detailed description that follows.

The elements encountered in a GNSS tolling system 10 illustrated in FIG. 1 are a GNSS satellite 11, an OBU 12, a proxy 13 and a back office 14. There is a first exchange of data communication 15 between the OBU and the proxy, and a second exchange of data communication 16 between the proxy 13 and a back office 14. There is no limitation with regard to the technology involved with the exchange of information between the different units. There is not necessarily a one-to-one relation between the shown elements; there will e.g. typically be a number of satellites 11 disseminating information enabling the localization of the OBU at any given point in time. All calculations made and/or conclusions drawn with regard to assessment of passages may be performed either locally, like in the individual OBUs, centrally in a back office or by a proxy or in any other combination found convenient therefore.

Figure 2:
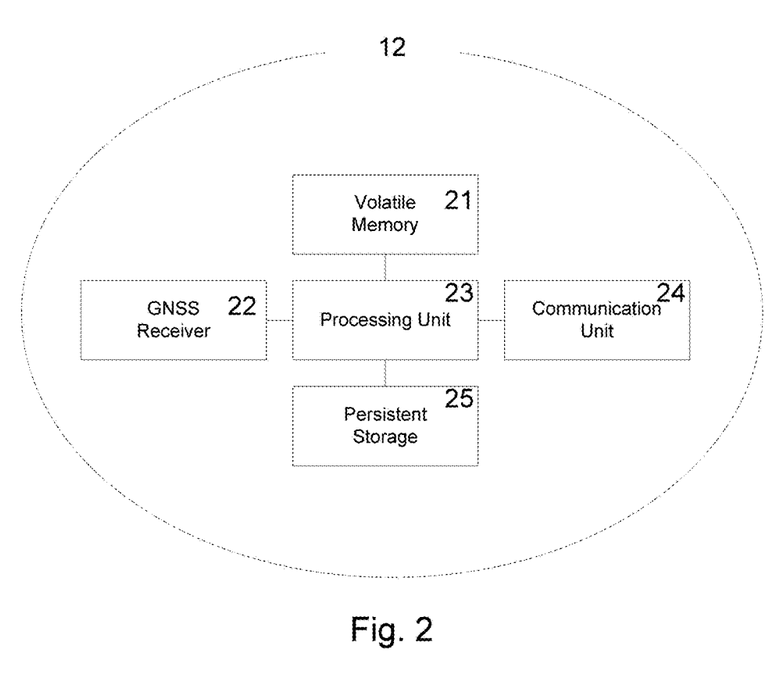
FIG. 2 is a schematic illustration of the internal structure of an OBU unit.

FIG. 2 illustrates the main components of the OBU 12. The OBU includes a volatile memory 21, a GNSS receiver 22, a processing unit 23, a communication unit 24 and persistent storage 25. The OBU may be a physical device dedicated to the GNSS tolling system, but it may also be present as a function integrated in other devices fit for the purpose, such as a tachograph or other device, portable, mounted in, or integrated in the vehicle.

These components are standard components of an OBU unit for GNSS road user charging, and their function is therefore not explained in more detail here.

It should be emphasized that while the inventive concept makes use of such a system, the GNSS 10 and the OBU 12 are generally known. The GNSS module 10 may be implemented with different levels of sophistication, ranging from a simple GPS receiver to a complex navigation unit using information from multiple GNSS systems, motion sensors with vehicle instruments and sensors.

Figure 3:
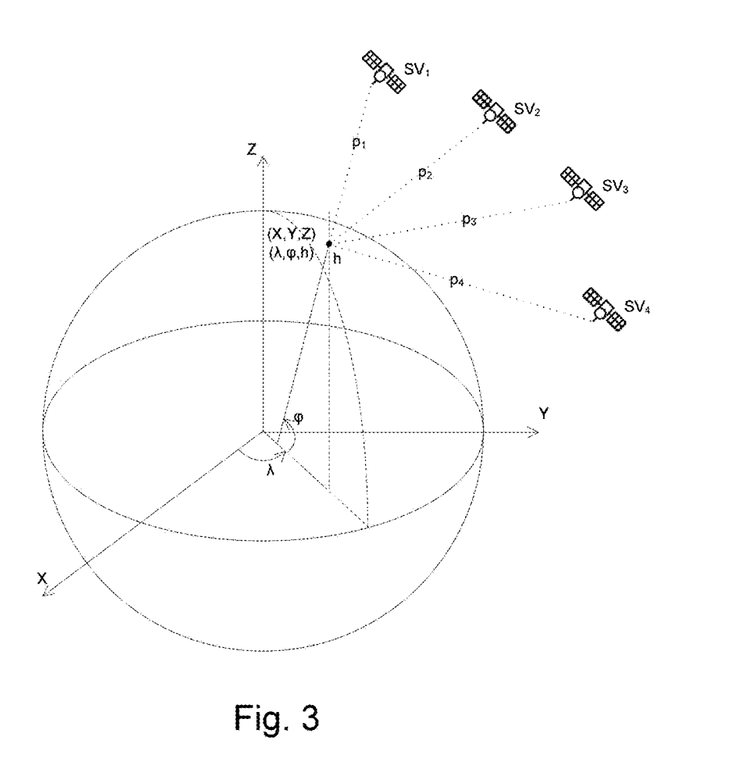
FIG. 3 is a schematic illustration of the coordinate systems with satellites.

FIG. 3 illustrates the earth with two different coordinate systems and four GNSS satellites. Coordinates for use by the method and system of the present invention may according to a preferred embodiment be expressed in Earth-Centred Earth-Fixed (ECEF), a 3 dimensional orthogonal coordinate system (X,Y,Z). Origin of the ECEF system is formed by the centre of mass of the earth. ECEF is thus the natural coordinate system for satellite orbital calculations. For referencing locations on earth the World Geodetic System (WGS84) is more convenient. This is based on an ellipsoid approximating the earth. ECEF coordinates may be transformed to longitude, latitude, and ellipsoid height ($\lambda,\varphi,h$). Furthermore, ellipsoid height may be translated to height above mean sea level by applying geoid separation information.

The figure also shows GNSS space vehicles ($SV_1$, $SV_2$, $SV_3$, and $SV_4$) with pseudo ranges from an observation point on earth to each space vehicle.

Figure 4:
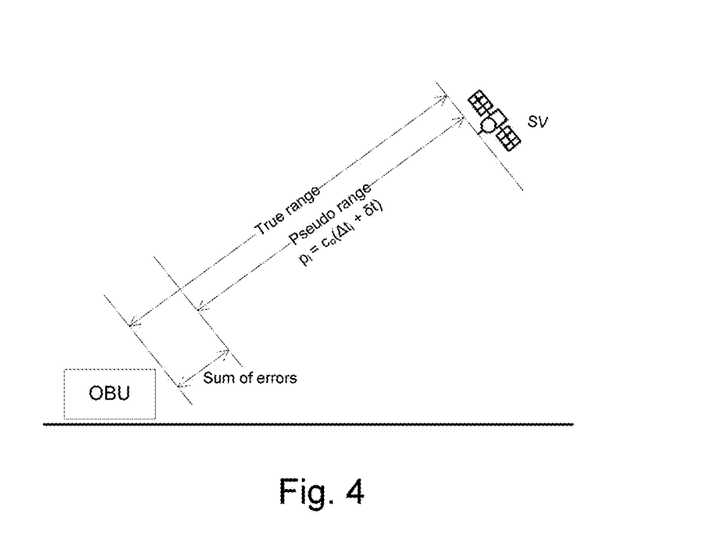
FIG. 4 is a schematic illustration of the relationship between pseudo range and true range.

FIG. 4 shows how the distance between the OBU (observation point) and the space vehicle is measured. The measurement is called pseudo range. The measurement differs from the true range by an aggregation of multiple error sources. Pseudo range is calculated by multiplying speed of light ($c_0$) with the measured propagation time.

Figure 5A:
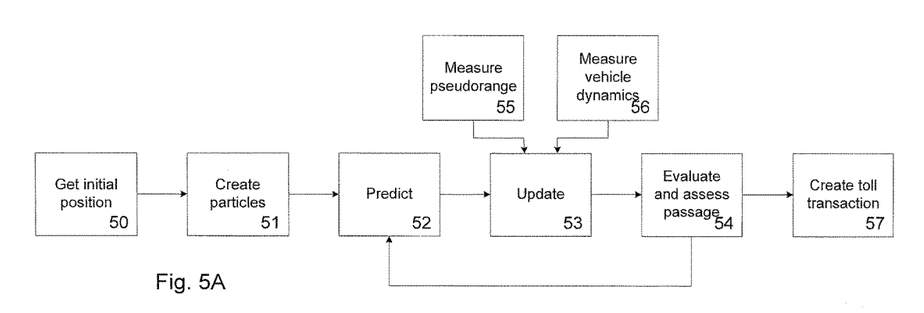
FIG. 5A is a schematic illustration of the general steps of the disclosed method.

FIG. 5A shows the general steps involved in the disclosed method. In a first step 50 an initial position for a vehicle is established by any convenient method. Then, in step 51 a chosen number of particles are generated according to the principles of the Sequential Monte Carlo method. In a subsequent step 52 a prediction of the state variables of each particle is made according to a process model to be further elaborated below. Thereafter the probabilities or "weights" of the particles are updated in a step 53, optionally involving measurement of additional properties related to the vehicles. In step 54 passage or non-passage is evaluated and assessed based on either individual particles or on the probability distribution. Steps 52-56 are operating recursively. The final step 57 of FIG. 5 is the issuance of a toll transaction when the evaluation step 54 so decides. The weights represent a probability after having been subjected to a suitable scaling factor.

Figure 5B:
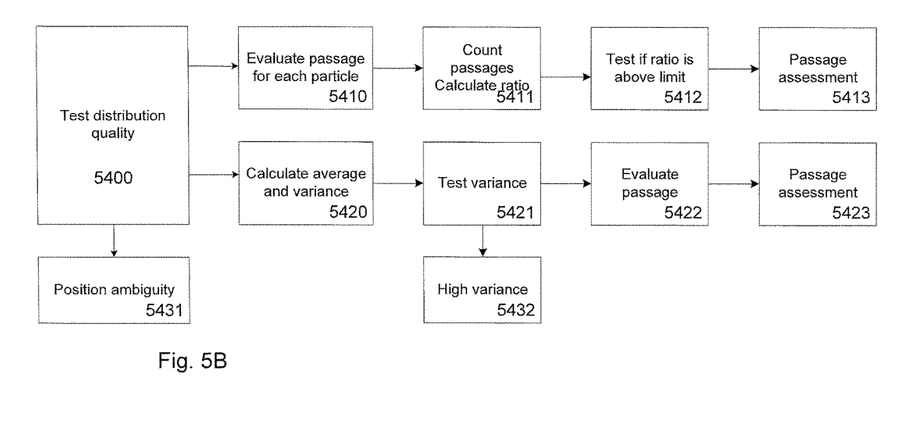
FIG. 5B is a schematic illustration of the sub-steps for the evaluation and assessment of passage of step 54 in FIG. 5A.

FIG. 5B shows details of step 54 in the method according to the present invention. In an initial step 5400 the probability distribution is examined to assess if the filter is inconclusive a possible position estimate ambiguity exists. If such ambiguity exist the method proceeds to step 5431 and no further processing takes place, which in practice means that the step of assessing passage or non-passage is concluded in the negative if a position ambiguity is detected. The steps 5410, 5411, 5412 and 5413 illustrates the method where VG, zone, and segment passage detection is performed on each particle in step 5410, in step 5420 the number of particles where a passage is detected is counted while taking weights into account, resulting in a ration of passages over total particles. Step 5412 compares this ratio to a defined confidence limit and if the ratio is above the limit, passage or non-passage is assessed in step 5413. The steps 5420, 5421, 5422, and 5423 illustrates the method where first a state vector is estimated in step 5420 by calculation of average or median over all particles to get a position estimate, variance is also calculated, in step 5421 the variance is tested against a defined limit and if the variance is too high, the method proceeds to step 5432 and no further processing takes place. If the variance is found to be adequate for tolling; VG, zone, and segment passage detection is performed on the position estimate in step 5422, passage or non-passage is assessed in step 5423.

In general, the probability of passage of a tolling object selected from the group consisting of a Virtual Gantry (VG), a zone, and a segment can be calculated individually for each particle and the probability for the vehicle actually passing the VG, the zone or the segment from the ratio of particles having passed through the VG, the zone or the segment, when the ratio is above a defined confidence limit.

Figure 6:
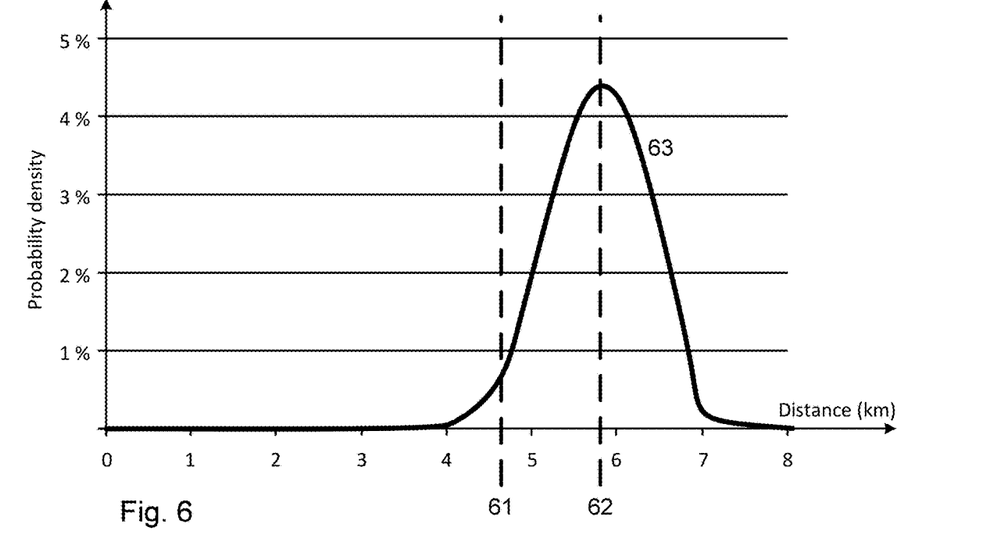
FIG. 6 is a schematic plot of a probability distribution of distances travelled represented by an ensemble of particles.

FIG. 6 shows the probability distribution 63 of distances measured by a number of particles in the Particle filter ensemble. The average of the distances, in this example, is 5.8 km (right dashed vertical line 62). To avoid over charging road users, the system may select a confidence level of e.g. 2% (in this example) and conclude that the distance travelled by the vehicle is less than 5.1 km (left dashed vertical line 61) with 98% confidence.

Figure 7:
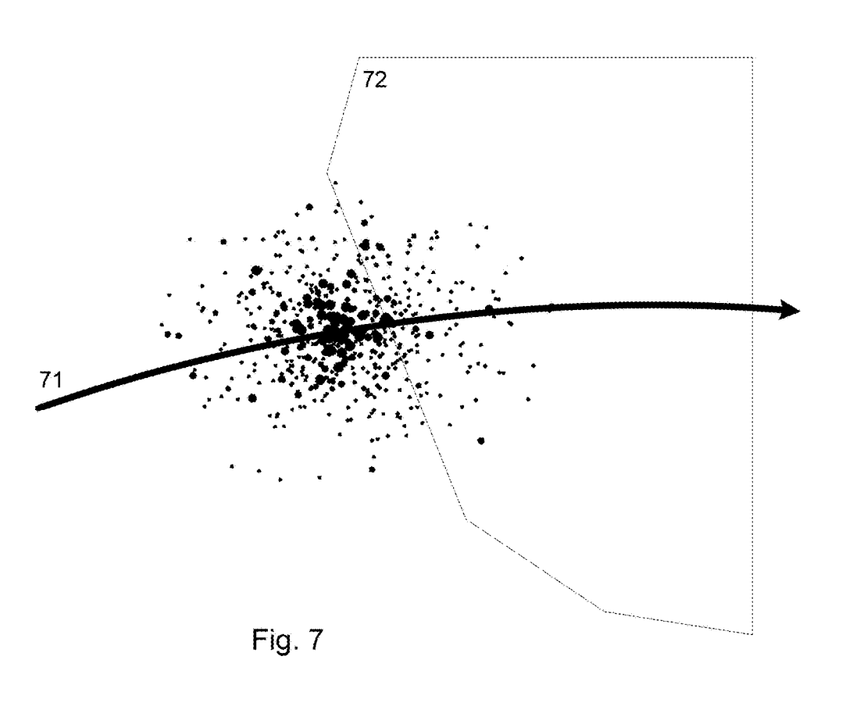
FIG. 7 is a schematic plot of an ensemble of particles where the vehicle is close to a zone border.

FIG. 7 shows a particle cloud representing an ensemble of particles for a vehicle close to a zone border. The zone is shown as a closed polygon 72. Each black dot represents a particle with a specific weight, larger circles have larger weight. Black arrow 71 indicates vehicle trajectory. By calculating the ratio of particles inside and outside, accounting for the weights, a probability for vehicle inside/outside may be deduced. The polygon may be defined as a 2-dimensional object by an ordered list of longitude and latitude pairs, or as a 3-dimensional object where longitude and latitudes is augmented by height information. A 3-dimensional definition may be required in some instances if roads are crossing at multiple levels. The definition may be transformed to ECEF coordinates as needed to simplify method execution.

Figure 8:
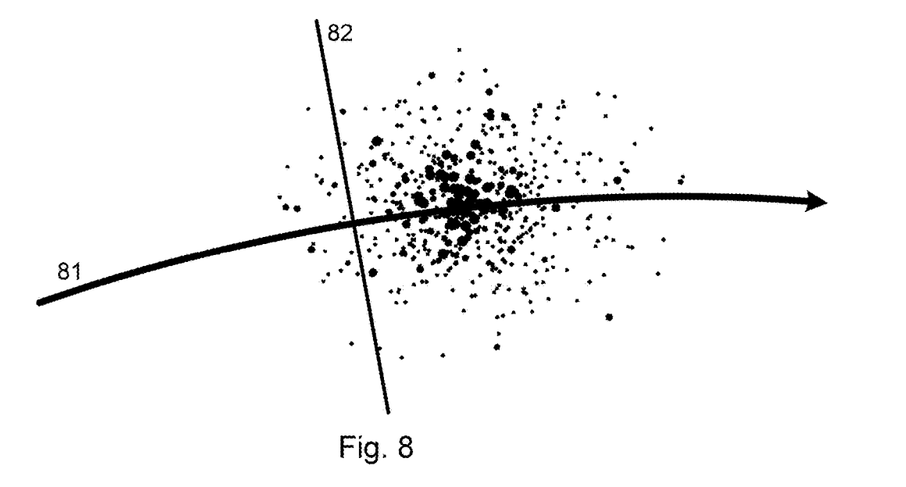
FIG. 8 is a schematic plot of an ensemble of particles where the vehicle is close to a virtual gantry.

FIG. 8 shows a particle cloud representing an ensemble of particles for a vehicle close to a virtual gantry. Black arrow 81 indicates vehicle trajectory (road). The virtual gantry charging point is shown as a line 82 crossing the road. Each black dot represents a particle with a specific weight, larger circles have larger weight. By calculating the ratio of particles before and after, accounting for the weights, a probability for the vehicle crossing the virtual gantry may be deduced. The virtual gantry may be defined as a 2 or 3-dimensional object similar to the zone definition.

Figure 9:
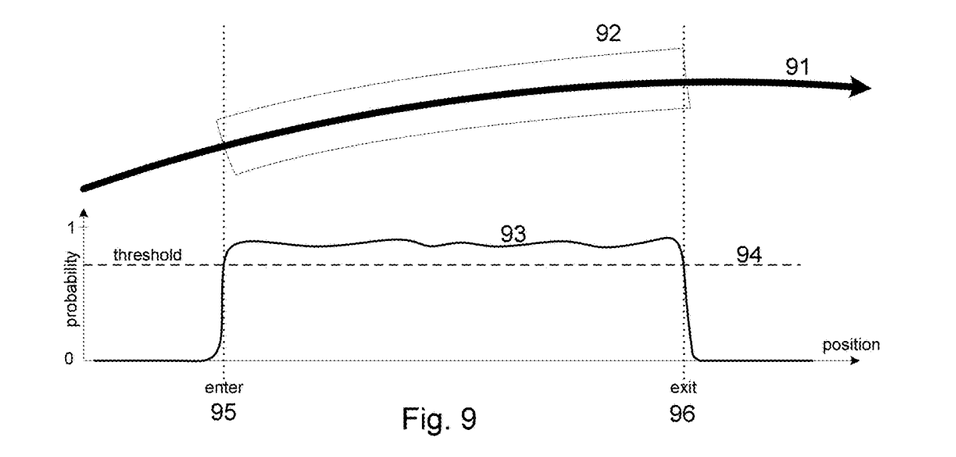
FIG. 9 is a schematic illustration of a road segment enclosed by a polygon accompanied by a graph showing the relationship between longitudinal position on the road and the probability of the vehicle driving on that particular road segment.

FIG. 9 shows a road 91 with a particular road segment enclosed by a polygon 92. It illustrates a method for detecting vehicles driving on the road segment to allow charging the road user for its use. Below the road is a graph 93 showing the probability of the vehicle driving on that particular road segment as a function of actual position. The probability may be calculated at each epoch from the particle ensemble by calculating the ratio of particles inside and outside, accounting for the weights. The ratio corresponds to the probability of the vehicle being inside the segment at that epoch. Repeating the process for each epoch will create the graph. By applying a threshold 94, an assessment of the road segment passage and the associated enter 95 and exit 96 events can be made. The segment may be defined as a 2 or 3-dimensional object similar to the zone definition.

Figure 10:
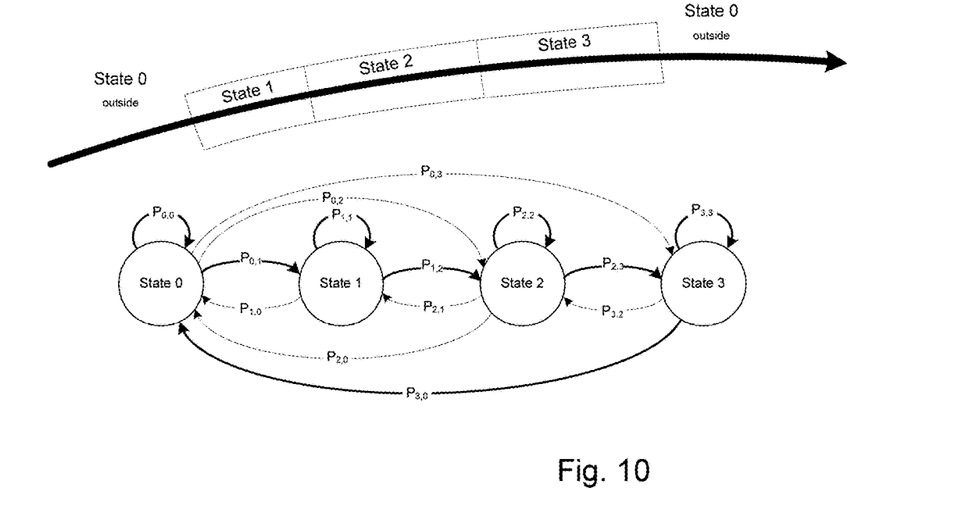
FIG. 10 is a schematic plot of a road segment divided into a number of states where a Markov model is applied.

FIG. 10 shows a road where three adjacent non-overlapping polygons are created, enclosing a road section. Each polygon represents a transient state while driving on the road. A state diagram representing the above transition state matrix is shown. A vehicle driving on the road in the direction of the arrows will pass through states 0, 1, 2, 3, and 0 in that order, shown as bold arrows in the state diagram.
Global Navigation Satellite System Positioning is based on measuring time differences between send time at the satellites and reception time at the receiver. This time difference has two components: actual propagation time $\Delta t$, and receiver clock bias $\delta t$, as illustrated in FIG. 4. The receiver clock bias will be common in all observed pseudoranges in one navigation system. By applying the speed of light ($c_0$), the pseudo range may be calculated. Tropospheric delay is related to chemical composition of the troposphere and the path length the signal is travelling. Zenith path delay is the delay when the signal is travelling the shortest possible path. The pseudo range is different from the true range because of contributions from many sources of error such as small deviations in the orbit of satellites, code lock quantification, reflection of signal from near-by buildings or mountains, clock errors, troposphere and ionosphere properties, etc. Some of these error factors are of a seemingly stochastic nature, while other factors are more correlated in time, at least within a certain period of time. Other error factors may be more dependent on local topographical elements, such as errors caused by reflection of signals from terrain or nearby structures like buildings.

The dynamic system of the moving vehicle is described by a process model that describes how the state variable evolves over time, and a measurement model that describes how the measurements relate to the state vector and the process model.
Process Model The exemplary state vector below can be used to represent the dynamic system.

$$x_t = (x_t, \dot{x}_t, y_t, \dot{y}_t, z_t, \dot{z}_t, g_t, \dot{g}_t, zpd_t) \quad (1)$$

where x, y, z are coordinates in ECEF, $\dot{x}$, $\dot{y}$, $\dot{z}$ are the first derivate of position, i.e. velocity, g is clock bias in the receiver, $\dot{g}$ is the first derivate of the clock bias, and zpd is the zenith path delay.

The process model describes how the state vector evolves over time and is generally written as:

$$x_t = \varphi_t(x_{t-1}) + \eta_t \quad (2)$$

where $x_t$ is the state vector, $\varphi_t$ is a possibly time-varying and non-linear function, and $\eta_t$ is process noise. In our exemplifying process model, $\varphi_t$ is linear and the equation may be written as:

$$x_t = \Phi x_{t-1} + \eta_t \quad (3)$$

$$\Phi = \begin{pmatrix} \Phi_v & 0 & 0 & 0 & 0 \\ 0 & \Phi_v & 0 & 0 & 0 \\ 0 & 0 & \Phi_v & 0 & 0 \\ 0 & 0 & 0 & \Phi_g & 0 \\ 0 & 0 & 0 & 0 & 1 \end{pmatrix}, \quad (4)$$

$$\Phi_v = \Phi_g = \begin{pmatrix} 1 & \Delta t \\ 0 & 1 \end{pmatrix}$$

where $\Delta t$ is the time between two successive update cycles.
Measurement Model The measurement model describes how the measurement vector depends on $x_t$ and is generally written as $z_t$:

$$z_t = h_t(x_t) + \epsilon_t \quad (5)$$

where $h_t$ is a possibly time-varying and non-linear function and $\epsilon_t$ is measurement noise. There will be one element in the measurement vector $z_t$ for each observed pseudo range measurement (1 . . . n):

$$h_t(x_t) = \begin{pmatrix} p_{t,1} \\ p_{t,2} \\ \vdots \\ p_{t,n} \end{pmatrix} \quad (6)$$

$$p_{t,i} = \sqrt{(x_t - x_{t,i})^2 + (y_t - y_{t,i})^2 + (z_t - z_{t,i})^2} + g_t + \frac{zpd_t}{\sin el_{t,i}} + \epsilon_{t,i} \quad (7)$$

where $el_{t,i}$ is the elevation of satellite i (where $$\frac{\pi}{2}$$

is representing zenith) and $(x_{t,i}, y_{t,i}, z_{t,i})$ is the position of satellite (or space vehicle—SV) i. The measurement model in the Particle filter may be arbitrary complex, the only requirements is that it is computable, whereas in a Kalman filter model it must be linear.

While decoding the signals from the satellites, in addition to the all-important timing information there is also ephemeris information, enabling the satellite receiver to calculate the satellite position at the time of transmission. Typically a receiver will decode and use signal from at least four satellites to calculate both a position estimate and the receiver clock bias. When more satellite signals are available the receiver will apply estimation algorithms to find the optimal solution to the problem using information collected over some period of time and from all available sources (satellites). In a typical outdoor environment, about 10 GPS and 8 GLONASS satellites are within view (at the time of this writing), but it is expected that the European Galileo and Chinese Beidou deployment programmes will increase the number of visible satellites to 40 within 2020. Assuming that each modernized satellite will broadcast multiple navigation signals, possibly on multiple frequencies, a plethora of pseudo range measurements will be available for each satellite. This is an advantage for the measurement model because more measurements are available. Pseudo range measurements from the same satellite will be positively correlated.

Traditionally, in low-cost GNSS receivers, the position estimate have been calculated using a Kalman filter (or variations thereof, such as the Extended Kalman filter). The simplest form of the Kalman filter assumes that the error terms are Gaussian distributed and independent, and that the process model is linear. The Kalman filter can be shown to create a statistically optimal position solution if the assumptions for the application of Kalman filter are fulfilled. One way to get a linear process model is to linearize around a specific state (i.e. coordinate). If the a-priori estimated state is offset from the true state, the linearization may produce significant errors in the propagation of the covariance information and thus the position estimates. Furthermore, non-Gaussian, or time dependant errors may also affect the performance of the Kalman filter. Errors originating in the atmosphere and space segment (orbital errors, clock errors) will often create errors that are slowly varying and thus non-Gaussian. Additionally, long tails (outliers) are not taken into account by the Gaussian approximation. The model mismatch will also cause the state variable covariance matrix to be difficult to interpret, making it difficult to make an assessment of the error in the estimated position.

Particle Filter

The Particle filter is also known as Sequential Monte Carlo method. The filter consists, as the Kalman filter, of a prediction step and a subsequent update step. Let there be B particles in the Particle filter. The prediction step consists of simply sampling from the process model b=1, ..., B times $$x_t^{(b)} = \varphi_t(x_{t-1}) + \eta_t^{(b)} \quad (8)$$

Here, $\eta_t^{(b)}$ is a process noise term. The prediction step gives samples that together represent the distribution of the state vector $x_t$ given all previous measurements $z_t$ $$\pi(x_t|z_{0:t-1}) \quad (9)$$

This probability distribution (represented by the B particles) is then updated by conditioning on the last measurement $z_t$ to $$\pi(x_t|z_{0:t}) \quad (10)$$

The Particle filter has fewer limitations than the Kalman filter. There is no assumption about a linear process model, and it is possible to use any model for the process and measurement noise. The Kalman filter may be regarded as a special case of a Particle filter, if the process model is linear and the noise is Gaussian, the Particle filter and the Kalman filter will find the same solution. The objective of the Particle filter is to estimate the probability density function for all state variables given the measurements, whereas the Kalman filter only estimates the state variables mean value and the covariance matrix from where standard deviations may be derived. This is because the Kalman filter assumes Gaussianity, in which the distribution is completely specified by its mean vector and covariance matrix. For a large ensemble it can be shown that the particle ensemble will converge to the true distribution. The Particle filter is described by a process model, and a measurement model, similar to what is known from the Kalman filter, except that both may be non-linear. Initially, a large ensemble of particles is created by using a-priori information, giving each particle equal probability (or weight). Each particle has its own state vector. Initial position information may be calculated from the GNSS pseudo ranges by applying a traditional Kalman filter or other estimation methods, also non-GNSS methods such as crude position estimates from mobile network measurements may be used. A first position estimate may also use the last known position. One advantage of the Particle filter is that the possibility to simple adaptation to non-Gaussian measurement errors agree well with the error characteristics of GNSS pseudo range measurements, i.e. they have larger occurrences of outliers layers, that are highly correlated in time.

It can be assumed that errors for individual satellites are independent. Thus their distributions multiplied together are enabling only one combined pseudo range measurement distribution. Additional measurement models (and distributions) may be based on accelerometers, turn rate gyroscopes, vehicle wheel speed, barometric pressure sensors, magnetic compass, and other physical in-vehicle measurements. Vehicle heading change can be deduced from wheel speed sensors detecting the wheel speed of two wheels at each end of a wheel axis, preferably a non-steering axis as well as steering wheel angle sensors.

For each epoch (e.g. each second), the process model is applied and noise is added, to prepare the particles for the next epoch. This is called the prediction step. The particles' weights are updated according to how well their values from the prediction step agree with the measurements. The particles are then drawn randomly with replacement and according to probabilities proportional to the particles' weights. This is called the update step. Some particles will be drawn multiple times and some will not be drawn. The task of drawing state variables from a multidimensional state variable space may be computationally expensive. Multiple methods have been developed to make more efficient use of available computing resources. The Rao-Blackwellized optimization method may be used to exploit any linear Gaussian sub-structure present in the model and process that by a conventional Kalman filter. The paper of Cappé et al., identified above, shows the actual execution steps of the Particle filter in detail.

Figure 11:
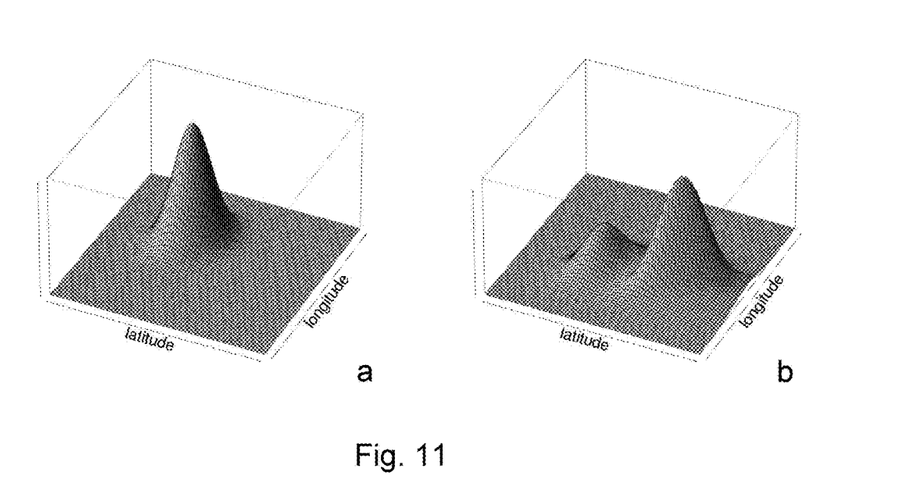
FIG. 11 shows two schematic plots of the probability distribution as a function of longitude and latitude.

The position estimates $(\hat{x},\hat{y},\hat{z})$ or $(\hat{\lambda},\hat{\varphi},\hat{h})$ found from the probability distribution $\pi(x_t|z_{0:t})$, using $E(x_t|z_{0:t})$ or median $(x_t|z_{0:t})$, are in general better position estimates than the ones from the standard Kalman filter solution. The expected value, $E(x_t|z_{0:t})$, is typically calculated by applying the weights to get an weighted average value. They can therefore be used directly in the tolling decisions. For example, the distance driven can be computed from the sum of the increments of the sequence of $(\hat{x},\hat{y},\hat{z})$. Similarly, these improved position estimates can be used directly with well-known methods for discrete and continuous tolling schemes. By using information from the probability distribution, exemplified in FIG. 11, situations where the filter is inconclusive may be detected. FIG. 11b shows a situation where the probability distribution has two peaks, and the method can deduce that the position estimate is inconclusive and no tolling decisions should be attempted. FIG. 11a shows a situation where there is no such position ambiguity. Examining the probability distribution will reveal more information about the position estimate quality than simple variance $VAR(x_t|z_{0:t})$ calculations.

The particle ensemble may be used for tolling purposes in distance based tolling schemes. The distance may be calculated for each individual particle, and this will result in a collection of different distances with weights. This will represent the probability distribution of the distances and may be plotted as illustrated in FIG. 6. The peak of the distribution will be close to the median or average distance. To reduce the risk of overcharging road users a confidence level of e.g. 98% may be selected and the distance calculated from that. In this way, only 2% of road users will be overcharged and 98% will be charged for less than the actual driven distance. If the distribution has no significant peak or multiple peaks, this indicates that the distance calculation has high uncertainty and no charge should be calculated.

Discrete State Variables

The state vector may include discrete states, for example $$I_t = \begin{cases} 0 & \text{if outside zone or segment} \\ 1 & \text{if inside zone or segment} \end{cases} \quad (11)$$

Of the B particles, the proportion with $I_t=1$ represents the estimated probability for being inside the zone or segment. This probability could also have been computed outside the Particle filter, by computing the proportion of estimated states within a zone or segment. Defining it as part of the state vector allows for a tighter integration with the system and measurement process, for example by a separate process model inside the zone or segment.

For zone based schemes, the zone detection may be performed for each individual particle, i.e. the inside/outside zone property is part of the state vector. To make the zone passage decision, all particles are examined and the ratio of particles inside vs. outside is calculated, accounting for weights. If the ratio is above a specified limit, the zone event is assessed. If the limit is set to e.g. 98% this means that 2% false positives will be charged. FIG. 7. shows a particle cloud entering into a zone.

For virtual gantry schemes, the gantry detection may be performed on each individual particle, i.e. the passage of the gantry is part of the state vector. After each prediction and update iteration, all particles are examined and the ratio of particles passed is calculated, accounting for weights. If the ratio is above a specific limit, the virtual gantry passage event is assessed. FIG. 8 shows a particle cloud passing a virtual gantry.

For segment based schemes, the segment detection may be performed on each individual particle, i.e. the on/off road segment property is part of the state vector. A segment in this context may be regarded as a specialization of zone where the polygon describing the zone circumscribes the road, with some tolerance, creating a tolling corridor. When particles are inside the corridor, tighter constraints may be put on the process model (more likely to proceed in forward direction, less likely to turn sharply to left or right, etc), effectively altering the process model. At each epoch, the particles inside vs. outside the corridor are counted. If the ratio exceeds a specific limit, the vehicle is considered to be on the road segment. FIG. 9 illustrates the road with a polygon enclosing a road segment and a graph showing the ratio.

A further generalisation is to divide a road segment or virtual gantry approach into several adjacent non-overlapping polygons, where each polygon corresponds to a state as illustrated in FIG. 10, where the discrete state variable $S_t$ may take the values 0 (outside), 1, ..., $n_S$ (inside). $n_S$ is the number of states describing a segment. In the following we will use $n_S=3$ as an example. A successful passage corresponds with a transition from state 0 to 1, state 1 to 2, state 2 to 3, and state 3 to 0. Similarly, a detour from state 0 to 1, state 1 to 2, state 2 to 1, state 1 to 2, state 2 to 3 and state 3 to 0 is also valid. Depending on the size of the segment, the object may be in each state more than one epoch, for example if driving slowly or if the polygons are large.

The state vector of the Particle filter can then be modified to include the state variable $S_t$;

$$x_t=(x_t, \dot{x}_t, y_t, \dot{y}_t, z_t, \dot{z}_t, g_t, \dot{g}_t, zpd_t, S_t) \quad (12)$$

Likewise, the process model $x_t=\varphi_t(x_{t-1})+\eta_t$ must include $S_t$. This can be done with a Markov transition state matrix P for $S_t$, $$P = \begin{pmatrix} p_{0,0} & p_{0,1} & p_{0,2} & p_{0,3} \\ p_{1,0} & p_{1,1} & p_{1,2} & 0 \\ p_{2,0} & p_{2,1} & p_{2,2} & p_{2,3} \\ p_{3,0} & 0 & p_{3,2} & p_{3,3} \end{pmatrix} \quad (13)$$

$p_{i,j}$ is the probability of a transition from $S_{t-1}=i$ to $S_t=j$. The sum of each row is 1. $p_{1,3}=0$ and $p_{3,1}=0$, since it is not possible to bypass a part of the segment if the passing is to be legitimate. Thus, in general, $p_{i,j}=0$ if $i,j>0$ and $|i-j|>1$. P can be estimated from historical data which includes the low-end GNSS receiver and a high-end reference. $p_{0,0}$, the probability of remaining outside, will then typically be quite high. The method will therefore be on the conservative side, and not declare that the tolling object has been entered before it is very likely or certain. This can be alleviated by having local transition matrices P around each tolling object.

In addition, the process model may depend on the state, for example by a different movement model within a tolling region, $$x_t=\varphi_t^{S_t}(x_{t-1})+\eta_t^{S_t} \quad (14)$$

Now, our interest lies in the probability of passing through the tolling object in the right order, $$P(S_{t-4}=0, S_{t-3}=1, S_{t-2}=2, S_{t-1}=3, S_t=0|z_{0:t}) \quad (15)$$

In this case, we envision that only one epoch is spent in each state, but more than one epoch can of course in general be spent in each state, for example $$P(S_{t-10} = 0, S_{t-9} = 1, S_{t-8} = 1, S_{t-7} = 1, S_{t-6} = 1, \quad (16)$$
$$S_{t-5} = 1, S_{t-4} = 1, S_{t-3} = 2, S_{t-2} = 2, S_{t-1} = 3, S_t = 0|z_{0:t})$$

Refinements

Two significant refinements of the measurement model have been developed. The error term $\epsilon_t$ is usually assumed to be Gaussian and independent from one epoch to the next.
1) By assuming a heavy tailed distribution, e.g. a Student's t-distribution with few degrees of freedom, for $\epsilon_t$, less weight is put on extreme measurements (pseudo range measurements), thereby yielding a better solution or estimate of the true state vector, resulting in better decisions.
2) The error terms are not necessarily independent from one epoch to the next, for example due to weak signals or continuously and consistently multi-path reflected signals. This will lead to underestimation of the spread (e.g. the variance $VAR(x_t|z_{0:t})$) in the estimated probability distribution for the state vector. This may be mitigated by introducing autocorrelation for the measurement errors through an autoregressive model, here of order 1;

$$\epsilon_t=\Psi\epsilon_{t-1}+\omega_t \quad (17)$$

$\omega_t$ is a new noise term, which can be Gaussian or follow some heavy tailed distribution. The autoregressive transition matrix $\Psi$ can be diagonal with entries between −1 and 1, to ensure a stationary process. The autoregressive model can be refined further, in general to $$\epsilon_t=\Psi_1\epsilon_{t-1}+\Psi_2\epsilon_{t-2}+ \ldots +\Psi_p\epsilon_{t-p}+\omega_t \quad (18)$$

The above refinements, identified as items (1) and (2) can be combined within the Particle filter.

A typical use of the method and system herein described would, as already mentioned, be for invoicing road-users according to any one of a number of principles, such as passage of a virtual gantry, distance driven along a certain road or the like. For this purpose any assessment of passage concluded as occurred, typically is at least temporarily stored for further use.

Obtaining a value for initial vehicle position typically involves utilization of a priori information, selected from a) last known position with a corresponding high uncertainty, b) estimating a position from pseudo ranges using traditional methods, and c) estimating by using information from mobile phone networks.

The tolling objects of the present invention are typically defined as spatial objects selected among 2 dimensional objects defined by latitude and longitude and 3 dimensional objects, wherein the 3 dimensional tolling objects would typically be defined in Earth Centred Earth Fixed coordinate systems. For many scenarios, 2 dimensional objects suffice, but in some cases where roads pass each other on multiple levels, height information may be required. The passage detection may be performed in Earth Centred Earth Fixed coordinate system, in the latitude, longitude domain, or in any other suitable coordinate system.

Assessment of passage or non-passage may be derived from the probability distribution $\pi(x_t|z_{0:t})$ by first calculating the expected state $E(x_t|z_{0:t})$ or $\text{median}(x_t|z_{0:t})$ and variance $VAR(x_t|z_{0:t})$ and then using VG, zone, and segment detection methods on that state, if the variance is below a defined error margin. The assessment of passage can preferably in addition be based on the derived probability distribution $\pi(x_t|z_{0:t})$ of passing through the required states of a tolling object in the correct order.

Avoiding Charging for the Same Gantry, Zone, or Segment Multiple Times

Sometimes the method described above will detect the same toll object multiple times, even if the vehicle has made only one actual passage. Traditionally this has been corrected by post processing the events from the OBU in the back-office. A separate discrete state variable may be introduced to the state vector to indicate if a tolling object has been charged for or not. This can be achieved by a separate Markov transition matrix for the charging decision. The transition probability from charging to non-charging can then for example, be equal to 1 for a desired number of seconds or for a desired spatial position offset, before it is lowered to a lower probability again. This thereby increases the confidence in the charging decision and can eliminate "double charging" events.

The method may operate in time delayed mode, and base its decisions on both a-priori and a-posterior information. If the method can relax its real-time requirements and is allowed to make its passage assessments in retrospect, it will increase the confidence in the passage assessments. The delay may be expressed as a number of seconds or as a distance. E.g. the virtual gantry passage assessment is only made 10 seconds after the first indication of a passage. This can also be combined with a backwards smoothing filter, which means that we compute:

$$\pi(x_{t-k}|z_{0:t}), \ 0 \leq k \leq t \quad (19)$$

Additional Sensors

The process model used in the Particle filter can be extended to use additional measurements, like vehicle speed, heading and height. This can be done by adding new states to the state vector $x_t$, as well as updating the system and measurement process equations $\varphi_t$ and $h_t$. The non-linearities arising from the additional sensors in these functions are handled by the Particle filter. Many types of sensors may be used to measure this including wheel speed sensors, magnetometer, radar, imaging systems, barometric air pressure sensor, etc. Wheel speed may be measured individually on each wheel leading to indirect measurement of turn rate. Small and inexpensive sensors based on micro-electromechanical systems (MEMS) technology may be used to measure acceleration and rotations in 3 dimensions.

The measurement model for vehicle movement measurement sensors (such as acceleration and rotation) is relatively complex and non-linear due to the transformation from sensor frame to body (vehicle frame) and to ECEF. The details of this transformation is well known and outside the scope of this invention. Additional independent sensors generally increase the robustness of the estimation and thus the method performance. It is thus preferred, as indicated above, to combine use of GNSS pseudo range measurements with use of at least one sensor selected among accelerometers, gyroscopes, vehicle wheel speed sensors, barometric pressure sensors, and magnetic compasses. Furthermore, a digital map may be used to limit the space of possible system states to legal drives on known roads.

EXAMPLE

Experiments were performed by using a vehicle equipped with a high-performance inertial navigation system providing cm-level position accuracy. The vehicle was also equipped with a low-cost consumer grade GNSS receiver collecting pseudo range, timing information and other measurements required to execute the Particle filter method. The pseudo range measurements were used with the process model described in equations (1) to (7). Results are presented in FIG. 12. First an Extended Kalman Filter was used for reference. This is shown with a broken line. Large, irregular deviations from the true track are evident. The two different Particle filters were applied. Firstly, calculated with Gaussian distributed measurement noise, the result is shown with a dotted line. Secondly, calculated with t-distributed measurement noise with 3 degrees of freedom, the result is shown with a line overlaid with circles. It can be clearly seen that the Particle filter combined with t-distribution more closely follows the path of the reference track and thus enhances the position solution. This is related to the heavier tails of the t-distribution relative to the Gaussian distribution and its closer resemblance to the nature of the pseudo range errors.

The invention claimed is:

1. A method for assessing passages by a vehicle through a tolling object utilizing a global navigation satellite system (GNSS) comprising an on-board unit (OBU) in every vehicle to be surveyed by the system, said OBU receiving signals from satellites to consistently and frequently estimate position coordinates for the vehicles, comprising the steps of:
   (A) obtaining an initial vehicle position including a degree of uncertainty (50),
   (B) using computer hardware and software to assign (51) a predetermined number of particles for each vehicle, in a meaning understood by the Sequential Monte Carlo mathematical method, comprising a process model, a measurement model and a probability distribution,
   (C) using computer hardware and software to assign to each particle:
      (i) a common initial probability, and
      (ii) an initial state comprising at least three dimensional spatial position,
   (D) using computer hardware and software to define epochs in time within each of which the following procedure is conducted:
      (i) in a prediction step (52), using said process model to predict with uncertainty the state of each particle in the next epoch, generally represented as $x_t = \varphi_t(x_{t-1}) + \eta_t$, wherein $x_t$ is a state vector, $\varphi_t(x_{t-1})$ is a function used to predict the state $x_t$ in one epoch from information of the state in the previous epoch, and $\eta_t$ is a process noise term, the predictions of all particles within each epoch thereby representing the probability distribution of the state vector $x_t$ given all previous measurements $z_t$,
      (ii) in an updating step (53), using computer hardware and software to update the probability of the particles according to how well each particle's state from the prediction step agrees with GNSS pseudo range measurements, according to the equation $z_t=h_t(x_t)+\epsilon_t$, wherein $z_t$ is a measurement vector, $h_t(x_t)$ is a possibly time-varying function of the state, and $\epsilon_t$ is measurement noise, thereby updating the probability distribution, (iii) using computer hardware and software to assess passage or non-passage (54) by mathematically comparing the spatial definition of the tolling objects in question with the updated particle information from the prediction step (52) while applying a defined confidence level, (iv) recursively repeating steps (D)(i) through (D)(iii) at a predetermined rate.

2. The method of claim 1, comprising the step of storing any assessment of passage concluded for a predetermined duration.

3. The method of claim 2, wherein the probability of passage of a tolling object selected from the group consisting of a Virtual Gantry (VG), a zone, and a segment is calculated individually for each associated particle, and the probability for the vehicle actually passing the VG, the zone or the segment from the ratio of particles having passed through the VG, the zone or the segment, when the ratio is above a defined confidence limit.

4. The method of claim 2, wherein the assessment of passage or non-passage is derived from the probability distribution $\pi(x_t|z_{0:t})$ by first calculating the expected state $E(x_t|z_{0:t})$ or median$(x_t|z_{0:t})$ and variance VAR$(x_t|z_{0:t})$, and then using VG, zone, and segment detection methods on that state if the variance is below a defined error margin.

5. The method of claim 1, comprising combining use of GNSS pseudo range measurements with use of at least one sensor selected among accelerometers, gyroscopes, vehicle wheel speed sensors, barometric pressure sensors, and magnetic compasses, thereby improving accuracy.

6. The method of claim 5, wherein the probability of passage of a tolling object selected from the group consisting of a Virtual Gantry (VG), a zone, and a segment is calculated individually for each associated particle, and the probability for the vehicle actually passing the VG, the zone or the segment from the ratio of particles having passed through the VG, the zone or the segment, when the ratio is above a defined confidence limit.

7. The method of claim 5, wherein the assessment of passage or non-passage is derived from the probability distribution $\pi(x_t|z_{0:t})$ by first calculating the expected state $E(x_t|z_{0:t})$ or median$(x_t|z_{0:t})$ and variance VAR$(x_t|z_{0:t})$, and then using VG, zone, and segment detection methods on that state if the variance is below a defined error margin.

8. The method of claim 1, wherein step (A) comprises utilizing a priori information, selected from at least one of the group consisting of last known position with a corresponding high uncertainty, estimating a position from pseudo ranges using traditional methods, and estimating by using information from mobile phone networks.

9. The method of claim 1, wherein the coordinate system is an Earth Centred Earth Fixed coordinate system.

10. The method of claim 1, wherein the tolling objects are defined as objects selected among two-dimensional objects defined by latitude and longitude and three-dimensional objects.

11. The method of claim 10, wherein the tolling objects are defined as three-dimensional objects in Earth Centred Earth Fixed coordinate systems.

12. The method of claim 1, wherein in the step of assessing passage or non-passage in (D)(iii), passage is denied if a position ambiguity is detected.

13. The method of claim 1, wherein the probability of passage of a tolling object selected from the group consisting of a Virtual Gantry (VG), a zone, and a segment is calculated individually for each associated particle, and the probability for the vehicle actually passing the VG, the zone or the segment from the ratio of particles having passed through the VG, the zone or the segment, when the ratio is above a defined confidence limit.

14. The method of claim 13, comprising using virtual gantry, zone or segment passage detection based on the derived probability distribution $\pi(x_t|z_{0:t})$ of passing through the required states of a tolling object in the correct order.

15. The method of claim 1, wherein the assessment of passage or non-passage is derived from the probability distribution $\pi(x_t|z_{0:t})$ by first calculating the expected state $E(x_t|z_{0:t})$ or median$(x_t|z_{0:t})$ and variance VAR$(x_t|z_{0:t})$, and then using VG, zone, and segment detection methods on that state if the variance is below a defined error margin.

16. The method of claim 1, comprising using virtual gantry, zone or segment passage detection based on the derived probability distribution $\pi(x_t|z_{0:t})$ of passing through the required states of a tolling object in the correct order.

17. The method of claim 1, wherein discrete state variables are added to the system model to represent an actual toll charging based on an assessed passage.

18. A method for assessing distance driven by a vehicle utilizing a global navigation satellite system (GNSS) comprising an on-board unit (OBU) in every vehicle to be surveyed by the system, said OBU receiving signals from satellites to consistently and frequently estimate position coordinates for the vehicles, comprising the steps of:

(A) obtaining an initial vehicle position including a degree of uncertainty (50), (B) using computer hardware and software to assign (51) a predetermined number of particles for each vehicle, in a meaning understood by the Sequential Monte Carlo mathematical method, comprising a process model, a measurement model and a probability distribution, (C) using computer hardware and software to assign to each particle:
  (i) a common initial probability, and
  (ii) an initial state comprising at least three dimensional spatial position, (D) using computer hardware and software to define epochs in time within each of which the following procedure is conducted:
  (i) in a prediction step (52), using said process model to predict with uncertainty the state of each particle in the next epoch, generally represented as $x_t=\varphi_t(x_{t-1})+\eta_t$, where $x_t$ is the state vector, $\varphi_t(x_{t-1})$ is a function used to predict the state $x_t$ in one epoch from information of the state in the previous epoch, while $\eta_t$ is a process noise term, the predictions of all particles within each epoch thereby representing the probability distribution of the state vector $x_t$ given all previous measurements $z_t$,
  (ii) in an updating step (53), using computer hardware and software to update the probability of the particles according to how well each particle's state from the prediction step agrees with GNSS pseudo range measurements, according to the equation $z_t=h_t(x_t)+\epsilon_t$, where $z_t$ is a measurement vector, $h_t(x_t)$ is a possibly time-varying function of the state, and $\epsilon_t$ is measurement noise, thereby updating the probability distribution,
  (iii) using computer hardware and software to assess distance driven by creating the probability distribution (63) of the actual distance from individual particle distances as derived by step (D)(ii), by applying a defined confidence level, (iv) recursively repeating steps (D)(i) through (D)(iii) at a predetermined rate.

19. A system for assessing passages by a vehicle through a tolling object utilizing a global navigation satellite system (GNSS) comprising an on-board unit (OBU) in every vehicle to be surveyed by the system, said OBU receiving signals from satellites to consistently and frequently estimate position coordinates for the vehicles, comprising computer hardware and adapted computer software programmed to perform the following steps:

(A) obtaining an initial vehicle position including a degree of uncertainty (50), (B) using computer hardware and software to assign (51) a predetermined number of particles for each vehicle, in a meaning understood by the Sequential Monte Carlo mathematical method, comprising a process model, a measurement model and a probability distribution, (C) using computer hardware and software to assign to each particle:
  (i) a common initial probability, and
  (ii) an initial state comprising at least three dimensional spatial position, (D) using computer hardware and software to define epochs in time within each of which the following procedure is conducted:
  (i) in a prediction step (52), using said process model to predict with uncertainty the state of each particle in the next epoch, generally represented as $x_t = \varphi_t(x_{t-1}) + \eta_t$, where $x_t$ is the state vector, $\varphi_t(x_{t-1})$ is a function used to predict the state $x_t$ in one epoch from information of the state in the previous epoch, while $\eta_t$ is a process noise term, the predictions of all particles within each epoch thereby representing the probability distribution of the state vector $x_t$ given all previous measurements $z_t$,
  (ii) in an updating step (53), using computer hardware and software to update the probability of the particles according to how well each particle's state from the prediction step agrees with GNSS pseudo range measurements, according to the equation: $z_t = h_t(x_t) + \epsilon_t$, wherein $z_t$ is a measurement vector, $h_t(x_t)$ is a possibly time-varying function of the state, and $\epsilon_t$ is measurement noise, thus updating the probability distribution,
  (iii) using computer hardware and software to assess passage or non-passage by (54) mathematically comparing the spatial definition of the tolling objects in question with the updated particle information from the prediction step (52) while applying a defined confidence level,
  (iv) recursively repeating steps (D)(i) through (D)(iii) at a predetermined rate.

20. The system of claim 19, wherein the software is programmed to perform the step of transferring data concerning vehicle passage to a back office for further processing.

* * * * *